(12) United States Patent
Ye

(10) Patent No.: US 7,471,468 B2
(45) Date of Patent: Dec. 30, 2008

(54) PUSH AND PULL OPERATED READING LENS

(75) Inventor: Haifan Ye, Wenzhou (CN)

(73) Assignee: D.M. Merchandising, Inc., Elmhurst, IL (US)

( * ) Notice: Subject to any disclaimer, the term of this patent is extended or adjusted under 35 U.S.C. 154(b) by 67 days.

(21) Appl. No.: 11/756,762

(22) Filed: Jun. 1, 2007

(65) Prior Publication Data

US 2008/0151178 A1 Jun. 26, 2008

(30) Foreign Application Priority Data

Dec. 20, 2006 (CN) .................. 2006 0 1707985

(51) Int. Cl.
*G02B 27/02* (2006.01)
(52) U.S. Cl. .................. 359/803; 359/802; 362/455
(58) Field of Classification Search .................. 359/802, 359/803; 362/455
See application file for complete search history.

(56) References Cited

U.S. PATENT DOCUMENTS

| 5,412,199 | A | 5/1995 | Finkelstein et al. |
| 5,434,405 | A | 7/1995 | Finkelstein et al. |
| 5,608,203 | A | 3/1997 | Finkelstein et al. |
| 5,856,661 | A | 1/1999 | Finkelstein et al. |
| 6,176,430 | B1 | 1/2001 | Finkelstein et al. |
| 6,641,260 | B1 | 11/2003 | Avital |
| 6,764,192 | B2 * | 7/2004 | McChesney .................. 362/98 |
| 6,769,618 | B1 | 8/2004 | Finkelstein |
| 6,817,532 | B2 | 11/2004 | Finkelstein |
| 6,822,813 | B2 * | 11/2004 | Jim .......................... 359/802 |
| 2003/0201331 | A1 | 10/2003 | Finkelstein |
| 2005/0117229 | A1 | 6/2005 | Block |

* cited by examiner

*Primary Examiner*—Joseph Martinez
(74) *Attorney, Agent, or Firm*—Clausen Miller, PC

(57) ABSTRACT

A pocket sized reading device having a built in illuminating element that automatically turns on and off as the device is opened and closed. The device comprises a two piece plastic frame and a lens held within the frame.

4 Claims, 1 Drawing Sheet

PUSH AND PULL OPERATED READING LENS

BACKGROUND

1. Field of the Invention

Figure 1:
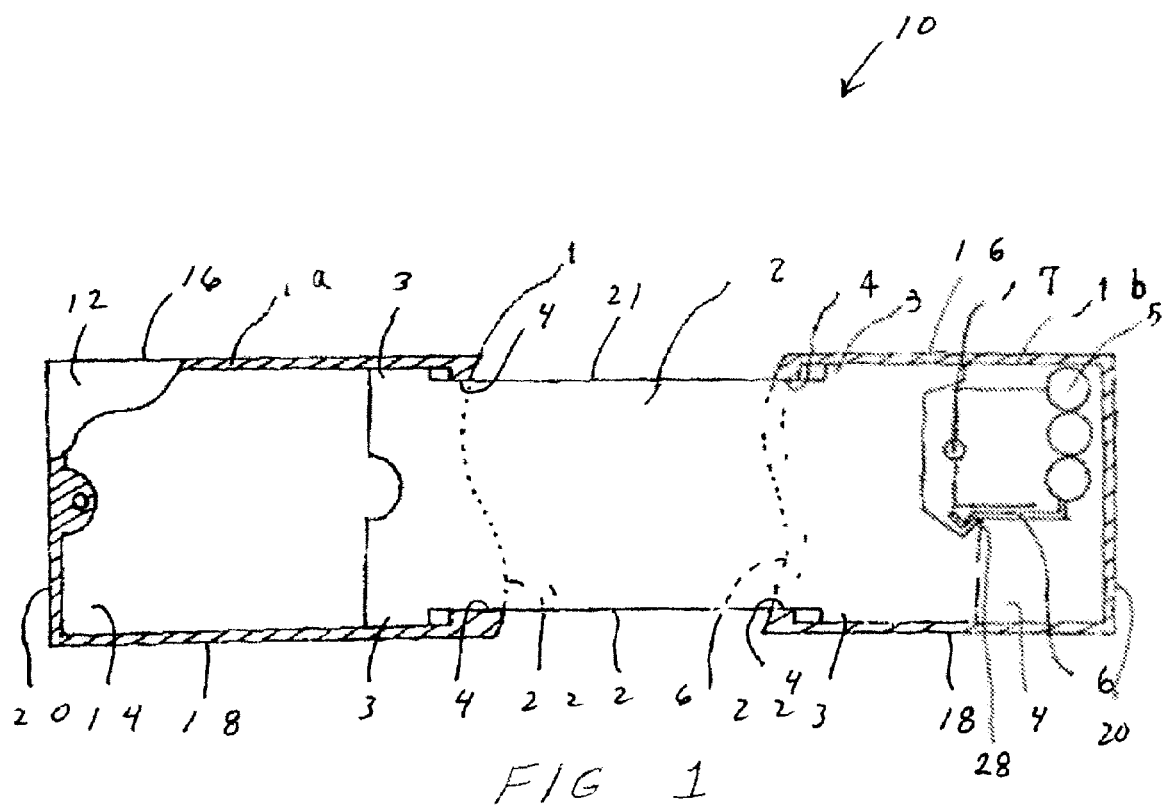

This patent relates to an optical glass of the kind used for reading. More particularly, this patent relates to an optical glass operated in push and pull fashion to expose and cover the glass.

2. Description of the Related Art

Typical reading glasses include two lenses, a frame and temples pieces, the frame and temple pieces being connected by hinges. The glasses typically rest on the bridge of the nose while the temples pieces are hooked around the ears of the wearer. The glasses are comparatively big, and carrying a pair of reading glasses can be inconvenient. Furthermore, reading glasses have limited benefits in low lighting or where lighting is absent.

In order to overcome these disadvantages the present invention provides an optical glass that is held within two opposing protective frames that can be slid apart to expose the glass or lens. The device includes a lighting element that automatically illuminates when the device is opened. The invention is simple to build and use, compact, easy to carry, and can be used in insufficient light.

Further and additional objects will appear from the description, accompanying drawings, and appended claims.

SUMMARY OF THE INVENTION

The present invention is a pocket sized reading device comprising a frame and a single lens. The frame comprises a left half and a right half, each half defining a hollow space for holding a part of the lens. The lens is slidingly held within the two halves such that, when the halves are pulled apart the lens is exposed and a light is automatically activated and when the two halves are pushed together the lens is concealed and the light is automatically deactivated.

Each frame half comprises top and bottom inwardly projecting slotted members defining slots therein for receiving the top and bottom edges of the lens in sliding engagement.

The lens further comprises flanges that abut the slotted members when the frame halves are pulled apart to prevent the lens from being completely removed from the frame.

The lighting means is located within one of the two frame halves and includes a power source and a switch. The light, power source and switch are electrically connected to form an electrical circuit. The lens includes a detent that impinges on the switch when the frame halves are pulled apart, thereby closing the circuit and activating the light.

THE DRAWINGS

FIG. 1 is a partial cutaway view of the device of the present invention, shown in an opened, or in use, position.

DETAILED DESCRIPTION OF THE INVENTION

While this invention may be embodied in many forms, there is shown in the drawing and will herein be described in detail one or more embodiments with the understanding that this disclosure is to be considered an exemplification of the principles of the invention and is not intended to limit the invention to the illustrated embodiments.

Turning to the drawings, there is shown in FIG. 1 one embodiment of the present invention, a reading device 10 having a built in illuminating element that automatically turns on and off as the device 10 is opened and closed. The device 10 comprises a frame 1, preferably made of plastic, and a lens 2 held within the frame 1.

The frame 1 is preferably rectangular ("card shaped") and comprises two halves consisting of a left half 1a and a right half 1b. Each half 1a, 1b in turn comprises front and back pieces that, when sandwiched together with screws or other assembly means, define an shallow hollow space therebetween within which the relatively flat lens 2 is disposed.

Each assembled frame half 1a, 1b is essentially a thin, six sided, three dimensional hollow object, comprising a front wall 12, a rear wall 14, a top wall 16, a bottom wall 18, an outer wall 20 and an inner wall 22. The front and rear walls 12, 14 form the largest surfaces. The top, bottom, outer and inner walls 16, 18, 20, 22 are relatively narrow. The front wall 12 is the side facing the user. The rear wall is the side facing away from the user; it has a small opening (not shown) through which the illuminating means can shine on the object being viewed. The inner walls 22 face each other and have complementary shapes so that they fit together when the device 10 is closed to conceal and protect the lens 2.

In the assembled reading device 10, the top wall 14 and bottom wall 16 of each frame half 1a, 1b each comprise an inwardly projecting slotted member 4, the function of which is explained below.

The lens 2 is substantially rectangular in shape and comprises a top edge 24, a bottom edge 26 and four outwardly extending flanges 3 near each of its four corners. The top and bottom edges 24, 26 are slidingly disposed within slots in the four slotted members 4, thereby allowing the frame halves 1a, 1b to be pulled apart and pushed together. As the frame halves 1a, 1b are pulled apart the lens flanges 3 eventually abut the slotted members 4 to prevent the lens 2 from being removed from the frame 1. The lens itself may be any suitable lens, including a simple convex lens, a Fresnel lens and a prescription lens.

The right frame 1b houses an illuminating means. The illuminating means comprises a power source 5 such as a button battery or batteries, a switch 6 and a light 7 such as a light emitting diode. Together these three components form an electrical circuit. At one of its corners the lens 2 includes a detent 9 that, when the frames 1a, 1b are pulled apart, impinges on the switch 6, causing it to close and thereby activate the light 7. Closing the frame 1 opens the switch 6 and deactivates the light 7. As noted above, the light 7 is positioned behind an opening (not shown) in the rear wall 14 of the right frame 1b so that the light 7 can illuminate the object being viewed through the lens 2.

Thus there has been described a reading device 10 having a built in illuminating element that automatically turns on and off as the device 10 is opened and closed. The device 10 comprises a two piece frame 1, preferably made of plastic, and a lens 2 held within the frame 1. The frame 1 can be opened by pulling apart the frame halves 1a, 1b to expose the lens 2 and closed by pushing together the frame halves 1a, 1b to cover the lens 2. When the frame 1 is opened a light 7 automatically shines on the object being viewed through the lens 2. The device is relatively thin, small and easily transportable in a purse or pocket.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

I claim as my invention:

1. A device comprising a frame and a single lens, the frame comprising a left half and a right half, each half defining a hollow space for holding a part of the lens, the lens being slidingly held within the two halves such that, when the halves are pulled apart the lens is exposed and a light is automatically activated, and when the two halves are pushed together the lens is concealed and the light is automatically deactivated, wherein each frame half comprises top and bottom inwardly projecting slotted members, each slotted member defining a slot therein, and wherein the lens has top and bottom edges that are slidingly disposed within the top and bottom slots.

2. The device of claim 1 wherein the lens farther comprises flanges that abut the slotted members when the frame halves are pulled apart, thereby preventing the lens from being removed from the frame 1.

3. The device of claim 2 wherein the light is disposed within one of the two frame halves, said frame half farther comprising a power source and a switch;

the light, power source and switch being electrically connected to form an electrical circuit.

4. The device of claim 3 wherein the lens further comprises a detent that impinges on the switch when the frame halves are pulled apart, thereby closing the circuit and activating the light.

\* \* \* \* \*